(12) United States Patent
Huang

(10) Patent No.: US 9,110,349 B2
(45) Date of Patent: Aug. 18, 2015

(54) WAVEGUIDE LENS WITH MODULATING ELECTRODE AND GROUND ELECTRODES

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 118 days.

(21) Appl. No.: 13/736,952

(22) Filed: Jan. 9, 2013

(65) Prior Publication Data

US 2014/0169725 A1    Jun. 19, 2014

(30) Foreign Application Priority Data

Dec. 17, 2012    (TW) .............................. 101147746 A

(51) Int. Cl.
| | |
|---|---|
| *G02F 1/29* | (2006.01) |
| *G02F 1/295* | (2006.01) |
| *G02B 6/124* | (2006.01) |
| *G02B 6/293* | (2006.01) |

(52) U.S. Cl.
CPC ................ *G02F 1/292* (2013.01); *G02F 1/295* (2013.01); *G02B 6/124* (2013.01); *G02B 6/29326* (2013.01); *G02F 2001/294* (2013.01)

(58) Field of Classification Search
CPC ............................ G02B 6/29326; G02B 6/124
USPC .................................................... 385/33, 37, 8
See application file for complete search history.

(56) References Cited

U.S. PATENT DOCUMENTS

| | | | | |
|---|---|---|---|---|
| 4,816,912 | A | * | 3/1989 | Suzuki et al. .................. 358/300 |
| 5,111,447 | A | * | 5/1992 | Yamashita et al. .......... 369/44.12 |
| 5,128,915 | A | * | 7/1992 | Yamashita et al. .......... 369/44.12 |
| 5,513,289 | A | * | 4/1996 | Hosokawa et al. .............. 385/33 |
| 2004/0247225 | A1 | * | 12/2004 | Tavlykaev .......................... 385/8 |

* cited by examiner

*Primary Examiner* — Ryan Lepisto
*Assistant Examiner* — Erin Chiem
(74) *Attorney, Agent, or Firm* — Novak Druce Connolly Bove + Quigg LLP

(57) ABSTRACT

A waveguide lens includes a substrate, a planar waveguide, a media grating, a modulating electrode, and two ground electrodes. The planar waveguide is formed on the substrate and is coupled to a laser light source which emits a laser beam into the planar waveguide. The media grating is formed on the planar waveguide and arranged along a direction that is substantially parallel with an optical axis of the laser beam. The modulating electrode is positioned on and covers the media grating. The ground electrodes are positioned on two sides of the planar waveguide and opposite to each other. The modulating electrode and the ground electrodes cooperatively change an effective refractive index of the planar waveguide to change an effective focal length of the diffractive waveguide lens, utilizing an electro-optical effect, when an electric field is applied thereto.

12 Claims, 3 Drawing Sheets

WAVEGUIDE LENS WITH MODULATING ELECTRODE AND GROUND ELECTRODES

BACKGROUND

1. Technical Field

The present disclosure relates to integrated optics, and particularly to a waveguide lens.

2. Description of Related Art

Lasers are used as light sources in integrated optics as the lasers have excellent directionality, as compared to conventional light sources. However, laser beams emitted by the lasers still have a divergence angle. As such, if the laser is directly connected to an optical element, some divergent rays may not be able to enter into the optical element, decreasing light usage.

Therefore, it is desirable to provide a waveguide lens, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
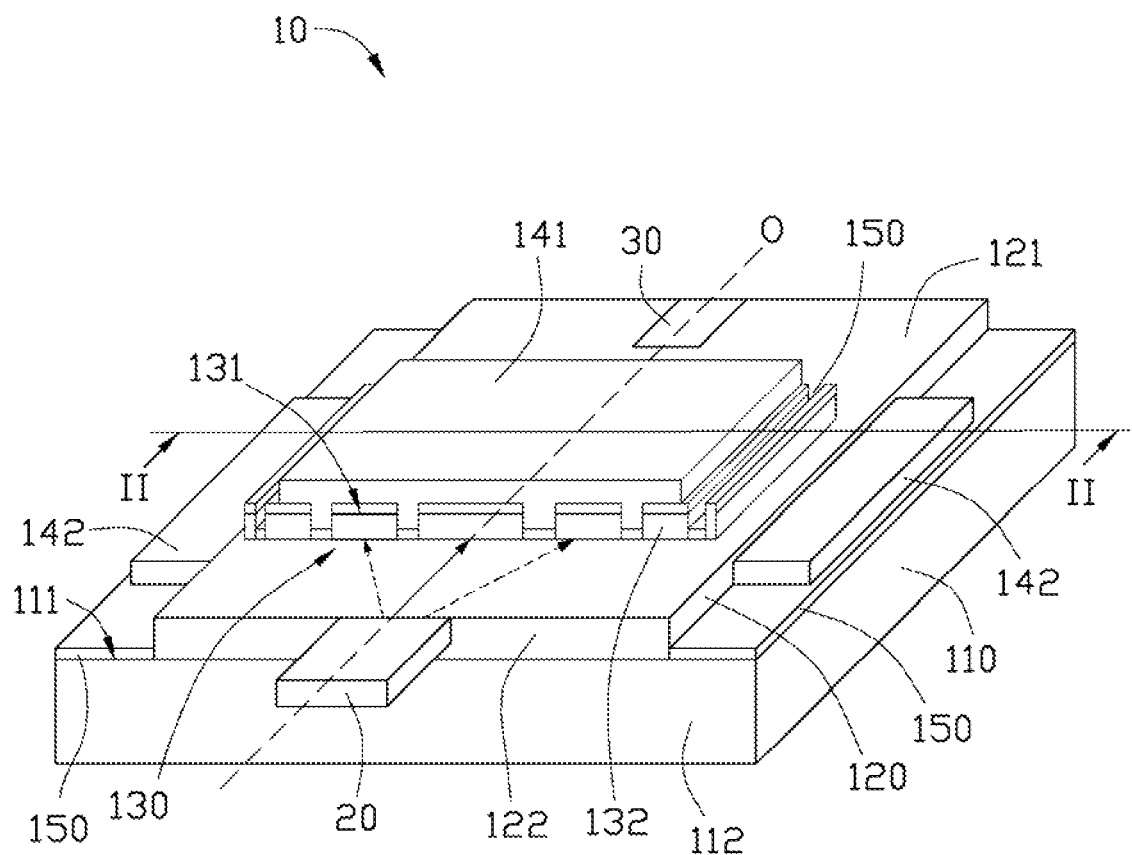
FIG. 1 is an isometric schematic view of a waveguide lens, according to an embodiment.
Figure 2:
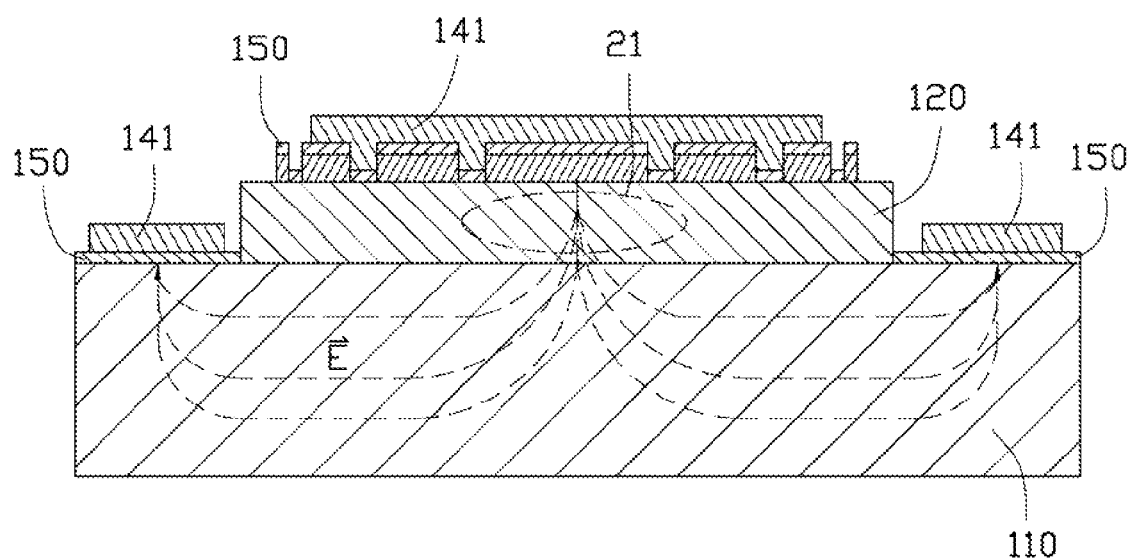
FIG. 2 is a cross-sectional view taken along a line II-II of FIG. 1.

Referring to FIGS. 1-2, a waveguide lens 10, according to an embodiment, includes a substrate 110, a planar waveguide 120 formed on the substrate 110, a media grating 130 formed on the planar waveguide 120, a modulating electrode 141 positioned on and covering the media grating 130, and two ground electrodes 142 positioned on the substrate 110 and arranged at opposite sides of the media grating 130. The planar waveguide 120 is coupled with a laser light source 20 which emits a laser beam 21 into the planar waveguide 120. The light beam 21 has a divergent angle and an optical axis O. The media grating 130 is arranged along a direction that is substantially parallel with the optical axis O. The media grating 130 and the planar waveguide 120 constitute a diffractive waveguide lens to converge all parts of the laser beam 21 into an optical element 30. The modulating electrode 141 and the ground electrodes 142 cooperatively change an effective refractive index of the planar waveguide 120 to change an effective focal length of the diffractive waveguide lens, utilizing an electro-optical effect, when a modulating electric field $\vec{E}$ is applied thereto.

In detail, the media grating 130 includes a number of media strips 132. Each media strip 132 and the planar waveguide 120 cooperatively form a strip-loaded waveguide. An effective refractive index of portions of the planar waveguide 120 where each media strip 132 is located (i.e., a portion of the planar waveguide 120 beneath each media strip 132) is increased. As such, by properly constructing the media grating 130, for example, constructing the media grating 130 as a chirped grating, the media grating 130 and the planar waveguide 120 can function as, e.g., a chirped diffractive waveguide lens.

By virtue of the modulating electrode 141 and the ground electrodes 142, and the accompanying modulating electric field $\vec{E}$, the effective focal length of the diffractive waveguide lens can be adjusted as desired to ensure the effective convergence of the laser beam 21 into an optical element 30 at any distance from the laser light source 20.

In addition, in a coordinate system XYZ (see FIG. 1), wherein X axis is a height direction of the planar waveguide 12 (i.e., perpendicular to the optical axis O and the media grating 130), Y axis is a width direction of the planar waveguide 12 (i.e., perpendicular to the optical axis O but parallel with the media grating 130), and Z axis is a length direction of the planar waveguide 12 (i.e., along the optical axis O), a portion of the electric field $\vec{E}$ interacting with the laser beam 21 is substantially parallel with the X axis. According to wave theory of planar waveguides, the laser beam 21 includes a transverse electric field (TE mode) and a transverse magnetic electric field (TM mode). The TE mode only has an electric field component $\vec{EY}$ vibrating along the Y axis. The TM mode only has an electric field component $\vec{Ex}$ vibrating along the X axis and a $\vec{Ez}$ vibrating along the Z axis. As such, the electric field $\vec{E}$ can effectively modulate the TM mode of the laser beam 21, as the electric field $\vec{E}$ is parallel with the vibration direction of the electric field component $\vec{Ex}$.

The substrate 110 is substantially rectangular and includes a first top surface 111 and a first side surface 112. In this embodiment, the substrate 110 is made of lithium niobate ($LiNbO_3$) crystal.

The planar waveguide 120 is substantially rectangular and formed on the first top surface 111, generally at a center thereof. The planar waveguide 120 includes a second top surface 121, opposite to the first top surface 11, and a second side surface 122, perpendicularly connecting the second top surface 121 and coplanar with the first side surface 111. The planar waveguide 120 is made of $LiNbO_3$ crystal diffused with titanium (hereinafter Ti:$LiNbO_3$), and the effective refractive index gradually changes along the width direction thereof, thus creating of the diffractive waveguide lens.

The media grating 130 is formed on the second top surface 121, generally at a center thereof, and includes a third top surface 131 opposite to the second top surface 121. The media grating 130 is also made of Ti:$LiNbO_3$. The media grating 130 is a chirped grating in this embodiment. There are an odd number of the media strips 132, including a central media strip 132 (hereinafter the central media strip 132), and an even number of side media strips 132 (hereinafter the side media strip 132) arranged on two sides of the central media strip 132. The media strips 132, including the central media strip 132 itself, are symmetrical about the optical axis O of the media grating 130. Each of the media strips 132 is rectangular and parallel to the optical axis O. In a direction from the optical axis O towards outmost media strip, the widths of the media strips 132 decrease, and the widths of the gaps between each two adjacent media strips 132 also decrease.

Figure 3:
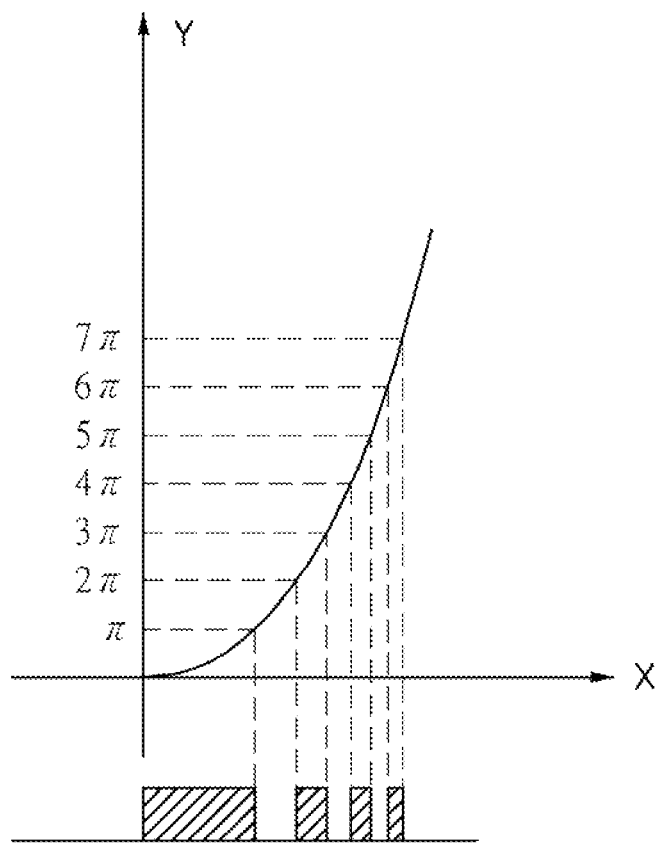
FIG. 3 is a schematic view of a media grating of the waveguide lens of FIG. 1.

Referring to FIG. 3, a coordinate system oxy is established, wherein the origin o is an intersecting point of the optical axis O and a width direction of the planar waveguide 120, x axis is the width direction of the planar waveguide 120, and y axis is a phase shift of the laser beam 21 at any point along the axis x. According to wave theory of planar waveguides, $y=a(1-e^{kx^2})$, wherein x>0, a, e, and k are constants. In this embodiment, boundaries of the media strips 132 conform with the conditions of the formulae: $y_n=a(1-e^{kx^2})$ and $y_n=n\pi$, wherein $x_n$ is the nth boundary of the media strips 132 along the "x" axis, and $y_n$ is the corresponding phase shift. That is, $$x_n = \sqrt{\frac{\ln\left(1-\frac{n\pi}{a}\right)}{k}} \ (x_n > 0).$$

The boundaries of the media strips 132 are where $x_x \leq 0$ can be determined by the characteristics of symmetry of the media grating 130.

The modulating electrode 141 is positioned on the third top surface 131 and substantially identical to the media grating 130 in shape and size, and aligns with the media grating 130. That is, the modulating electrode 141 is symmetrical about the optical axis O. The ground electrodes 142 are positioned on the first top surface 111 and symmetrical about the optical axis O and aligned with the media grating 130 so as to be parallel to the media strips 132. A length of each of the ground electrodes 142 is at least equal to a length of the media grating 130, and a height of each of the ground electrodes 142 is at least equal to a height of the media grating 130. As such, the modulating electric field $\vec{E}$ can effectively modulate the effective refractive index of the planar waveguide 120.

To avoid the light beam 21 being absorbed by the modulating electrode 141 and the ground electrodes 142, the waveguide lens 10 further includes a buffer layer 150 sandwiched between the media grating 130 and the modulating electrode 141, and between the planar waveguide 120 and the ground electrodes 142. The buffer layer 150 can be made of silicon dioxide.

The laser light source 20 can be a distributed feedback laser, and is attached to a portion of the side surface 112 corresponding to the planar waveguide 120.

The optical element 30 can be a strip waveguide, an optical fiber, or a splitter.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the possible scope of the disclosure but do not restrict the scope of the disclosure.

What is claimed is:

1. A waveguide lens, comprising:
   a substrate;
   a planar waveguide formed on the substrate and used for coupling with a laser light source which emits a laser beam having a divergent angle into the planar waveguide;
   a media grating formed on the planar waveguide and arranged along a direction that is substantially parallel with an optical axis of the laser beam;
   a modulating electrode positioned on and covering the media grating; and
   two ground electrodes positioned on the substrate and arranged at two opposite sides of the media grating, the modulating electrode and the ground electrodes being configured to change an effective refractive index of the planar waveguide, utilizing electro-optical effect, when a modulating electric field is applied thereto, and to change an effective focal length of the waveguide lens.

2. The waveguide lens of claim 1, wherein the substrate is made of lithium niobate crystal.

3. The waveguide lens of claim 1, wherein the planar waveguide is made of lithium niobate crystal diffused with titanium.

4. The waveguide lens of claim 1, wherein the media grating is made of lithium niobate crystal diffused with titanium.

5. The waveguide lens of claim 1, wherein the substrate is substantially rectangular and comprises a first top surface and a first side surface perpendicularly connected to the first top surface, the planar waveguide is formed on the first top surface and comprises a second top surface opposite to the first top surface and a second side surface perpendicularly connected to the second top surface and coplanar with the first side surface, the media grating is positioned on the second top surface and comprises a third top surface opposite to the second top surface, and the laser light source is attached to the second side surface.

6. The waveguide lens of claim 1, wherein the media grating is a chirped grating.

7. The waveguide lens of claim 1, wherein the media grating comprises a plurality of media strips, the number of the media strips is odd, the media strips are symmetrical about the optical axis, each of the media strips is rectangular and parallel with each other and the optical axis, in a direction from the optical axis to outmost media strip, widths of the media strips decrease, and widths of gaps between each two adjacent media strips also decrease.

8. The waveguide lens of claim 7, wherein boundaries of the media strips are set to conform to condition formulae:

$$x_n = \sqrt{\frac{\ln\left(1-\frac{n\pi}{a}\right)}{k}},$$

and $x_n>0$, wherein $x_n$ is the nth boundary of the media strips along an x axis, and a, and k are constants, and the x axis is along a width direction of the planar waveguide, and the x axis has an intersecting point of origin o on the optical axis.

9. The waveguide lens of claim 7, wherein the ground electrodes are symmetrical about the optical axis and lengthwisely aligned with the media grating so as to be parallel to the media strips, a length of each of the ground electrodes is longer or equal to a length of the media grating, and a height of each of the ground electrodes is greater than or equal to a height of the media grating.

10. The waveguide lens of claim 1, wherein the modulating electrode is substantially identical to the media grating in shape and size and aligns with the media grating.

11. The waveguide lens of claim 1, further comprising a buffer layer sandwiched between the planar waveguide and the ground electrodes, and between the media grating and the modulating electrode, the buffer layer being configured for preventing the light beam from being absorbed by the ground electrodes and the modulating electrode.

12. The waveguide lens of claim 11, wherein the buffer layer is made of silicon dioxide.

* * * * *